(12) United States Patent  
Long et al.

(10) Patent No.: US 12,203,530 B2
(45) Date of Patent: Jan. 21, 2025

(54) OFFSET PLANETARY GEAR FASTENER ASSEMBLY AND PLANETARY GEAR SYSTEM

(71) Applicant: DEERE & COMPANY, Moline, IL (US)

(72) Inventors: Randall L. Long, Coffeyville, KS (US); Marc Chapman, Coffeyville, KS (US); Briton T. Eastman, Coffeyville, KS (US)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 18/172,499

(22) Filed: Feb. 22, 2023

(65) Prior Publication Data

US 2023/0383816 A1  Nov. 30, 2023

Related U.S. Application Data

(60) Provisional application No. 63/365,551, filed on May 31, 2022.

(51) Int. Cl.
| | |
|---|---|
| *F16H 1/32* | (2006.01) |
| *F16H 57/021* | (2012.01) |
| *F16H 57/023* | (2012.01) |
| *F16H 57/08* | (2006.01) |

(52) U.S. Cl.
CPC ............. *F16H 1/32* (2013.01); *F16H 57/021* (2013.01); *F16H 57/023* (2013.01); *F16H 57/082* (2013.01)

(58) Field of Classification Search
CPC ........ F16H 1/32; F16H 57/021; F16H 57/023; F16H 57/082
See application file for complete search history.

(56) References Cited

U.S. PATENT DOCUMENTS

| | | | | |
|---|---|---|---|---|
| 3,315,547 | A | * 4/1967 | Fritsch | .................. F16H 1/2836 |
| | | | | 475/346 |
| 3,635,103 | A | 1/1972 | Monti | |
| 4,665,771 | A | * 5/1987 | Mitchell | ................. F16H 13/06 |
| | | | | 475/179 |
| 4,944,195 | A | * 7/1990 | Takahashi | ............... F16H 57/12 |
| | | | | 475/159 |
| 9,574,637 | B2 | * 2/2017 | Hansson | .................... F16H 1/28 |
| 9,797,475 | B2 | * 10/2017 | Altamura | .............. F16H 57/043 |
| 11,060,605 | B2 | * 7/2021 | Gilliland | ................. F16C 19/49 |

FOREIGN PATENT DOCUMENTS

| | | |
|---|---|---|
| CN | 109630621 A | 4/2019 |
| JP | 4250725 B2 | 4/2009 |

\* cited by examiner

*Primary Examiner* — Ha Dinh Ho

(57) ABSTRACT

A planetary gear system and a planet gear fastener assembly for a planetary gear system includes a planet gear having a planet gear axis, a carrier connected to the planet gear, and a sun gear that engages the planet gear. The planetary gear fastener assembly includes a washer having a washer axis and configured to be positioned against an axial end of the planet gear and a fastener extending through the washer to couple the washer to the carrier. The fastener includes a fastener axis positioned to be radially offset from the planet gear axis of the planet gear.

26 Claims, 3 Drawing Sheets

OFFSET PLANETARY GEAR FASTENER ASSEMBLY AND PLANETARY GEAR SYSTEM

CROSS-REFERENCE TO RELATED APPLICATIONS

This application claims priority to U.S. Provisional Patent Application Ser. No. 63/365,551, titled OFFSET PLANETARY GEAR FASTENER ASSEMBLY, filed May 31, 2022, which is hereby incorporated by reference in its entirety.

BACKGROUND

Planetary gear systems may include multiple planet gears connected to each other by a carrier. The carrier may include multiple posts with each planet gear rotating on or around or otherwise being coupled to one of the posts of the carrier. The planet gears engage and are positioned around a sun gear.

SUMMARY

According to an aspect of the present disclosure, a planetary gear fastener assembly for a planetary gear system includes at least one planet gear having a planet gear axis, a carrier connected to the at least one planet gear, and a sun gear configured to engage the at least one planet gear. The planetary gear fastener assembly includes a washer having a washer axis and configured to be positioned against an axial end of the at least one planet gear and a fastener extending through the washer to couple the washer to the carrier. The fastener includes a fastener axis positioned to be radially offset from the planet gear axis of the at least one planet gear.

The washer may include an indentation on a first axial side of the washer, and the fastener may further include a fastener head configured to be positioned on the first axial side of the washer in the indentation of the washer. The washer axis may be positioned to be aligned with the planet gear axis of the at least one planet gear. The indentation of the washer may be centered to be radially offset from the planet gear axis of the at least one planet gear. The indentation of the washer may be radially aligned with the fastener axis. The washer may further include a protrusion on a second axial side of the washer opposite from the first axial side of the washer. The protrusion may be centered, be positioned to be centered, and/or have a center that is positioned to be radially aligned with the washer axis. The protrusion may be configured to be positioned in a carrier post indentation of the carrier of the planetary gear system. The carrier post indentation of the carrier may be centered, be positioned to be centered, and/or have a center that is positioned to be radially aligned with the planet gear axis. The fastener axis may be positioned to be radially offset from the planet gear axis of the at least one planet gear by an offset distance that is greater than 1 millimeter.

According to an aspect of the present disclosure, a planetary gear system includes at least one sun gear, at least one planet gear having a planet gear axis, a carrier connecting the at least one planet gear to the at least one sun gear and including at least one carrier post rotatably coupled to the at least one planet gear, a washer having a washer axis and configured to be positioned against an axial end of the at least one planet gear, and a fastener extending through the washer to couple the washer to the at least one carrier post, the fastener including a fastener axis radially offset from the planet gear axis of the planet gear.

The washer may include an indentation on a first axial side of the washer, and the fastener may further include a fastener head positioned on the first axial side of the washer in the indentation of the washer. The washer axis may be concentric with the planet gear axis of the planet gear. The indentation of the washer may be centered to be radially offset from the planet gear axis of the planet gear. The indentation of the washer may be concentric with the fastener axis. The washer may further include a protrusion on a second axial side of the washer opposite from the first axial side of the washer. The protrusion may be concentric with the washer axis. The protrusion may be positioned in a carrier post indentation of the at least one carrier post of the carrier. The carrier post indentation of the carrier may be concentric with the planet gear axis. The fastener axis may be radially offset from the planet gear axis of the planet gear by an offset distance that is greater than 1 millimeter.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
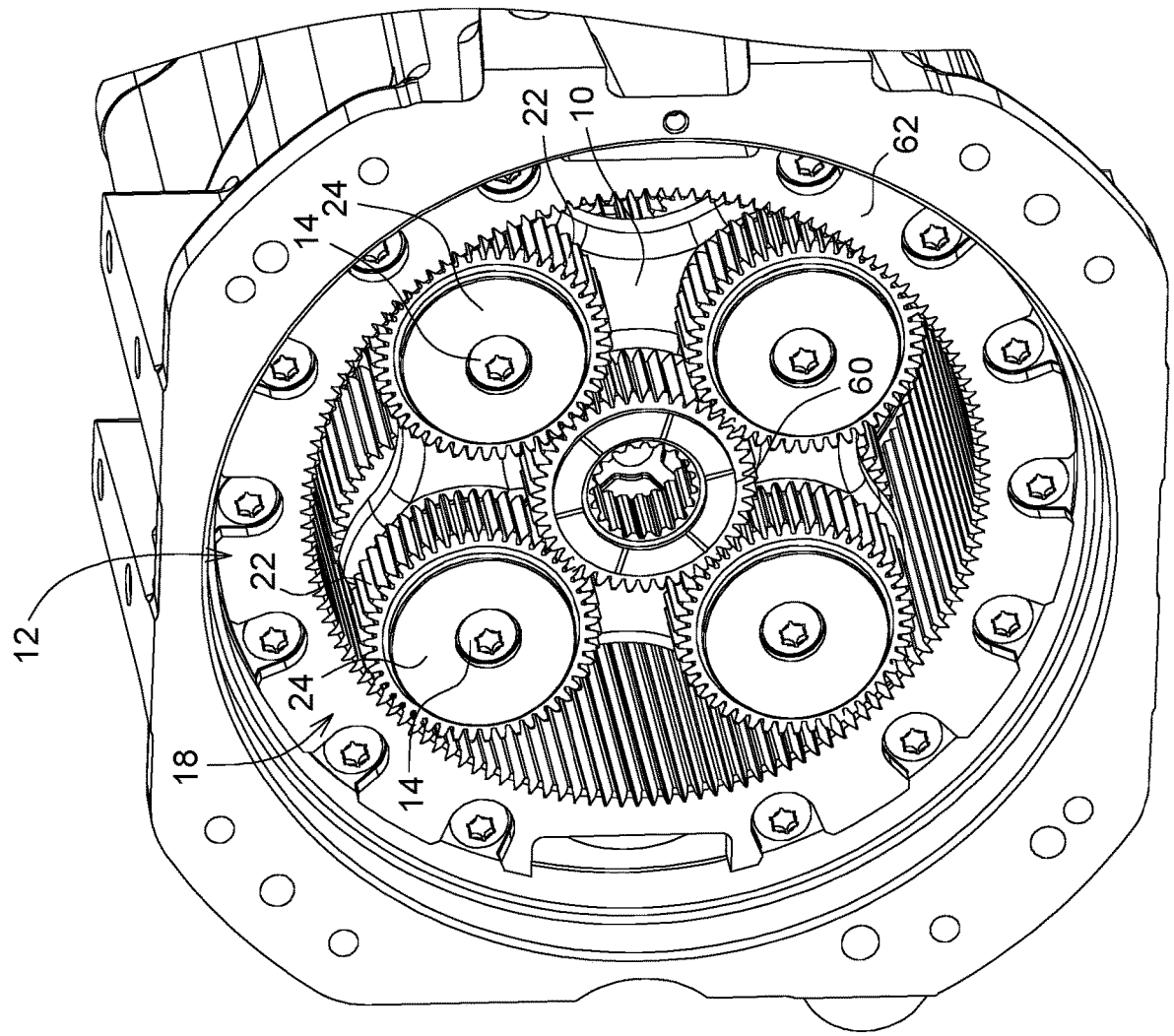
FIG. 1 illustrates a planetary gear system in accordance with one or more embodiments described herein.
Figure 2:
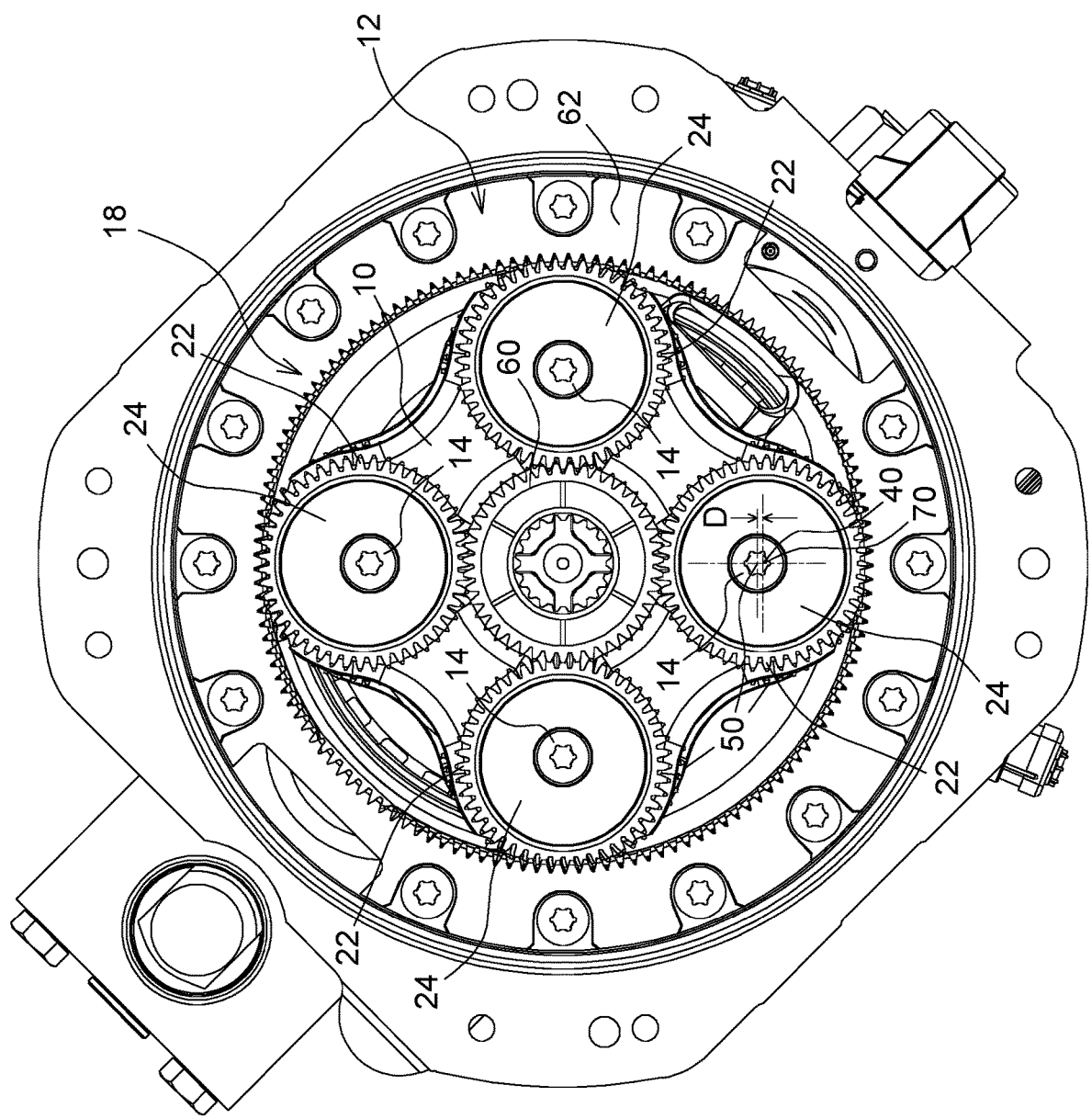
FIG. 2 illustrates a planetary gear system in accordance with one or more embodiments described herein.

Referring now to FIGS. 1 and 2, a planetary gear system 12 is illustrated in accordance with an embodiment of the present disclosure. The system 12 includes a sun gear 60 and a ring gear 62 in one or more embodiments. The system 12 further includes one or more planet gears 22 and a carrier 10 in one or more embodiments. The carrier 10 includes one or more posts 16. The carrier 10 may operate as and/or be used in either a rotating or stationary arrangement such that the carrier 10 may rotate relative to an outer housing (not shown) or a ground of the planetary gear system 12 and/or may be stationary relative to the housing.

Figure 3:
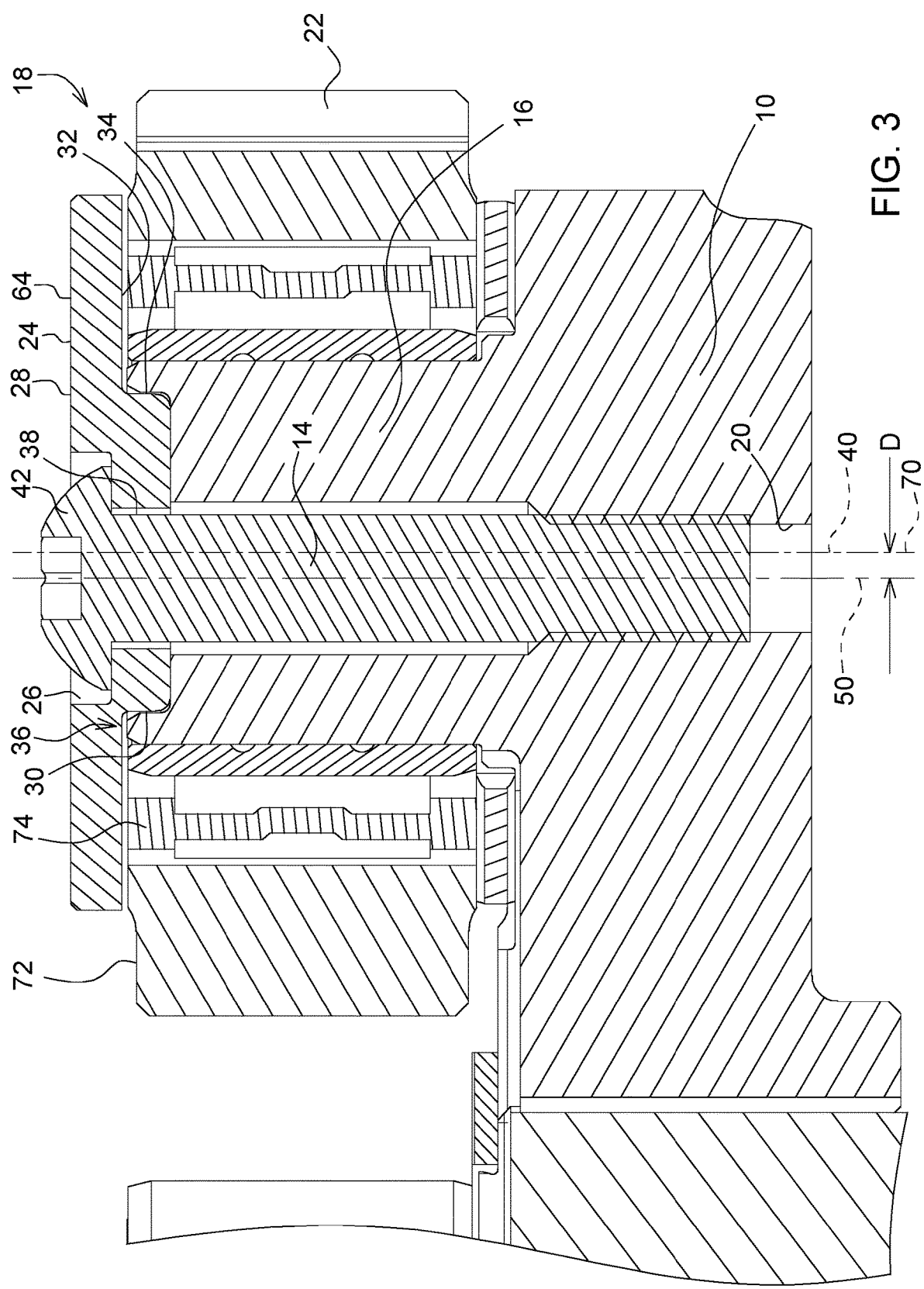
FIG. 3 is an enlarged cross-sectional view of a planetary gear fastener assembly in accordance with one or more embodiments described herein.

As shown in FIGS. 1 and 2 and in further detail in FIG. 3, embodiments of the present disclosure relate to a system, structure, assembly, and/or method for securing and/or retention of a pin, screw, or other fastener 14 to the post 16 of the carrier 10 forming part of a planet gear fastener assembly 18 of the planetary gear system 12. There may be only one fastener 14 for each planet gear fastener assembly 18 in an embodiment of the present disclosure, and there may be multiple fasteners 14 for each planet gear fastener assembly 18 in one or more additional embodiments.

The system 12 of the embodiment illustrated in FIG. 3 includes a bearing 74 positioned between the post 16 and the planet gear 22 to allow the planet gear 22 to rotate relative to the post 16. The post 16 defines a planet gear axis 40 and includes a hole 20 extending at least partially through the post 16 to accept the pin, screw, or other fastener 14 for securing or otherwise assembling a planet gear 22 to the post 16. In the illustrated embodiment, the hole 20 extends through the post 16 and the carrier 10. In the illustrated embodiment, the fastener 14 extends through the post 16. In the illustrated embodiment, the fastener 14 does not extend through the entire carrier 10 and/or the hole 20. It will be appreciated that, for the fastener 14 illustrated in embodiment of FIG. 3, the fastener 14 and the hole 20 include complementary threaded surfaces to allow engagement between the fastener 14 and the hole 20. In the illustrated embodiment, the threaded surfaces of the hole 20 are located in the carrier but not the post 16. In further embodiments not illustrated, the threaded surfaces of the hole 20 are located in the post 16. The location of the fastener 14 defines, and/or the fastener 14 includes a fastener axis 50. The system 12 may include three, four, five, or any other number of planet gears 22 in one or more embodiments, and the embodiments of the present disclosure apply to any one or more or all planet gears 22 and/or posts 16 of such planet gear fastener assemblies 18.

One or more embodiments of this disclosure include a washer 24 having a washer axis 70. The washer axis 70 is concentric with the planet gear axis 40 in an embodiment. The washer axis 70 of an embodiment is determined by the axial center of the washer 24 based on the outermost perimeter of the washer 24. The washer 24 may be positioned against an axial end 72 of the planet gear 22. The washer 24 of the illustrated embodiment covers and/or is positioned against the bearing 74, the post 16, and at least a portion of the planet gear 22. The washer 24 of the illustrated embodiment does not cover, is not positioned against, and/or is radially spaced from the teeth of the planet gear 22. In additional embodiments not illustrated, the washer 24 may cover or be positioned against the teeth of the planet gear 22 or may not cover or be positioned against the post 16, the bearing 74, and/or a portion of the planet gear. The fastener 14 extends through the washer 24 to couple the washer 24 to the carrier 10.

The washer 24 includes a hole, step, or indentation 26 extending into a first face or first axial side 28 of the washer 24. The indentation 26 of the washer 24 of an embodiment is centered, positioned to be centered, or has a center that is positioned to be radially offset from the planet gear axis 40 of the planet gear 22. The indentation 26 of the washer 24 is concentric with the fastener axis 50 in an embodiment.

The washer 24 includes a boss or protrusion 30 on a second face or second axial side 32 of the washer 24 that is opposite from the first axial side 28 of the washer 24. In one or more embodiments, the boss or protrusion 30 is concentric with the planet gear axis 40 and/or the washer axis 70, or the boss or protrusion 30 may be centered, be positioned to be centered, and/or have a center that is positioned to be radially aligned with the washer axis 70. The boss or protrusion 30 of the washer 24 centers the washer 24 into a mating groove or indentation 34 on an axial end 36 of the post 16 of the carrier 10. The carrier post indentation 34 is concentric with the planet gear axis 40, or the carrier post indentation 34 may be centered, be positioned to be centered, and/or may have a center that is positioned to be radially aligned with the planet gear axis 40 in embodiments. The washer 24 is round in an embodiment but may be or include another shape in additional embodiments. The washer 24 includes a hole or bore 38 that may be concentric with the fastener axis 50 and/or the step or indentation 26 but offset from the planet gear axis 40, a center of the boss or protrusion 30 of the washer 24, and/or the mating groove or indentation 34 of the post 16 of the carrier 10. As used herein, "concentric" or radial alignment refers to any relationship between two or more components, values, and/or dimensions where the two or more items have axes or geometric centers or are positioned to be centered such that they are radially aligned, substantially radially aligned, share the same center, or have substantially the same center. The washer axis 70, the planet gear axis 40, and the fastener axis 50 of the illustrated embodiment are parallel, or substantially parallel, such as within 10 degrees, with each other in the illustrated embodiment. In additional embodiments not illustrated, the washer axis 70, the planet gear axis 40, and/or the fastener axis 50 are not parallel or substantially parallel with each other.

The fastener axis 50 is radially offset from the planet gear axis 40 of the planet gear 22. The planet gear axis 40 is offset from the fastener axis 50 by an offset distance D. The offset distance D is greater than 1 millimeter in an embodiment. The offset distance D is greater than 5 millimeters in an embodiment. The offset distance D is greater than 10 millimeters in an embodiment. The offset distance D allows for the washer 24 and/or the fastener 14 to secure the planet gear fastener assembly 18 while minimizing or preventing the fastener 14 and/or the washer 24 from rotating relative to the post 16. In one or more embodiments, the offset distance D may be determined, at least partially, by tolerances of one or more components of the fastener assembly 18. If a relatively high precision is held along the fastener 14 or on components of the fastener assembly 18, the offset distance D may be small (e.g., less than or equal to 1 millimeter) relative to a fastener assembly 18 having larger tolerances. In some embodiments, the offset distance D may result from a stack-up of tolerance values around or along the fastener 14 resulting in any value across a wide range of values. The fastener 14 is offset in the assembly 18 from a planet gear axis defined by operational rotation of the planet gear 22 and/or planet gear fastener assembly 18, which are concentric with the planet gear axis 40.

A head 42 of the pin, screw, or other fastener 14 of an embodiment is positioned on the first axial side 28 of the washer 24 in the hole, step, or indentation 26 of the first axial side 28 of the washer 24. In an embodiment, the head 42 is positioned under an outermost surface 64 of the washer 24 to allow for the clearance of rotating components near the washer 24. The washer 24 of an embodiment may be assembled to the post 16 with an inset hole forming part of the hole 20 of the post 16 drilled or otherwise included in the post 16 to set the clearance for the planetary components to predetermined values.

Embodiments of the present disclosure provide a system, structure, assembly, and/or method for securing and/or retaining the fastener 14 to the carrier 10 forming part of the planet gear fastener assembly 18 of the planetary gear system 12 without the rotation of the planet gear 22 or other movement of the system 12 or a component of the system 12 unintentionally or undesirably loosening, removing, or otherwise moving the fastener 14 and/or the washer 24 from the assembly 18. Accordingly, the embodiments of the present disclosure more securely and durably couple the planet gear 22 to the carrier 10 without the need for additional fastener (s) or other coupling methods or components.

Any assembly, component, or method, or any portion(s) thereof described in any embodiment herein may be integrally formed with another or formed separately and joined together in additional embodiments of the present disclosure. As a non-limiting example, fastener 14 and washer 24 may be integrally formed together in an embodiment. Any assembly, component, or method, or any portion(s) thereof described in any embodiment herein may be formed as a metal, ceramic, composite, polymeric, elastomeric, and/or other material.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A planetary gear fastener assembly for a planetary gear system having at least one planet gear having a planet gear axis, a carrier connected to the at least one planet gear, and a sun gear configured to engage the at least one planet gear, the planetary gear fastener assembly comprising:
   a washer having a washer axis and configured to be positioned against an axial end of the at least one planet gear, the washer comprising an indentation on a first axial side of the washer; and
   a fastener extending through the washer to couple the washer to the carrier, the fastener comprising a fastener axis positioned to be radially offset from the planet gear axis of the at least one planet gear, and the fastener further comprising a fastener head configured to be positioned on the first axial side of the washer in the indentation of the washer.

2. The assembly of claim 1, wherein the washer axis is positioned to be aligned with the planet gear axis of the at least one planet gear.

3. The assembly of claim 1, wherein the indentation of the washer is centered to be radially offset from the planet gear axis of the at least one planet gear.

4. The assembly of claim 3, wherein the indentation of the washer is radially aligned with the fastener axis.

5. The assembly of claim 1, wherein the washer further comprises a protrusion on a second axial side of the washer opposite from a first axial side of the washer.

6. The assembly of claim 5, wherein the protrusion is centered to be radially aligned with the washer axis.

7. The assembly of claim 5, wherein the protrusion is configured to be positioned in a carrier post indentation of the carrier of the planetary gear system.

8. The assembly of claim 7, wherein the carrier post indentation of the carrier is centered to be radially aligned with the planet gear axis.

9. The assembly of claim 1, wherein the fastener axis is positioned to be radially offset from the planet gear axis of the at least one planet gear by an offset distance that is greater than 1 millimeter.

10. A planetary gear system comprising:
    at least one sun gear;
    at least one planet gear having a planet gear axis;
    a carrier connecting the at least one planet gear to the at least one sun gear and comprising at least one carrier post rotatably coupled to the at least one planet gear;
    a washer having a washer axis and configured to be positioned against an axial end of the at least one planet gear, the washer comprising an indentation on a first axial side of the washer; and
    a fastener extending through the washer to couple the washer to the at least one carrier post, the fastener comprising a fastener axis radially offset from the planet gear axis of the planet gear, and the fastener further comprising a fastener head positioned on the first axial side of the washer in the indentation of the washer.

11. The system of claim 10, wherein the washer axis is concentric with the planet gear axis of the planet gear.

12. The system of claim 10, wherein the indentation of the washer is centered to be radially offset from the planet gear axis of the planet gear.

13. The system of claim 12, wherein the indentation of the washer is concentric with the fastener axis.

14. The system of claim 10, wherein the washer further comprises a protrusion on a second axial side of the washer opposite from a first axial side of the washer.

15. The system of claim 14, wherein the protrusion is concentric with the washer axis.

16. The system of claim 14, wherein the protrusion is positioned in a carrier post indentation of the at least one carrier post of the carrier.

17. The system of claim 16, wherein the carrier post indentation of the carrier is concentric with the planet gear axis.

18. The system of claim 10, wherein the fastener axis is radially offset from the planet gear axis of the planet gear by an offset distance that is greater than 1 millimeter.

19. A planetary gear fastener assembly for a planetary gear system having at least one planet gear having a planet gear axis, a carrier connected to the at least one planet gear, and a sun gear configured to engage the at least one planet gear, the planetary gear fastener assembly comprising:
    a washer having a washer axis and configured to be positioned against an axial end of the at least one planet gear, the washer comprising a protrusion on a second axial side of the washer opposite from a first axial side of the washer; and
    a fastener extending through the washer to couple the washer to the carrier, the fastener comprising a fastener axis positioned to be radially offset from the planet gear axis of the at least one planet gear.

20. The assembly of claim 19, wherein the protrusion is centered to be radially aligned with the washer axis.

21. The assembly of claim 19, wherein the protrusion is configured to be positioned in a carrier post indentation of the carrier of the planetary gear system.

22. The assembly of claim 21, wherein the carrier post indentation of the carrier is centered to be radially aligned with the planet gear axis.

23. A planetary gear system comprising:
- at least one sun gear;
- at least one planet gear having a planet gear axis;
- a carrier connecting the at least one planet gear to the at least one sun gear and comprising at least one carrier post rotatably coupled to the at least one planet gear;
- a washer having a washer axis and configured to be positioned against an axial end of the at least one planet gear, the washer comprising a protrusion on a second axial side of the washer opposite from a first axial side of the washer; and
- a fastener extending through the washer to couple the washer to the at least one carrier post, the fastener comprising a fastener axis radially offset from the planet gear axis of the planet gear.

24. The system of claim 23, wherein the protrusion is concentric with the washer axis.

25. The system of claim 23, wherein the protrusion is positioned in a carrier post indentation of the at least one carrier post of the carrier.

26. The system of claim 25, wherein the carrier post indentation of the carrier is concentric with the planet gear axis.

* * * * *